United States Patent
Park et al.

(10) Patent No.: US 9,494,818 B2
(45) Date of Patent: Nov. 15, 2016

(54) DISPLAY WITH LOW REFLECTIVITY ALIGNMENT STRUCTURES

(71) Applicant: Apple Inc., Cupertino, CA (US)

(72) Inventors: Kwang Soon Park, Cupertino, CA (US); Byung Duk Yang, Cupertino, CA (US); Christopher L. Boitnott, Half Moon Bay, CA (US); Chun-Yao Huang, Cupertino, CA (US); Kuan-Ying Lin, Mountain View, CA (US); Kyung-Wook Kim, Cupertino, CA (US); Mohd Fadzli A. Hassan, San Francisco, CA (US); Shih Chang Chang, Cupertino, CA (US); Supriya Goyal, Santa Clara, CA (US); Yong Kwan Kim, Sunnyvale, CA (US); Yu-Cheng Chen, San Jose, CA (US)

(73) Assignee: Apple Inc., Cupertino, CA (US)

( * ) Notice: Subject to any disclaimer, the term of this patent is extended or adjusted under 35 U.S.C. 154(b) by 212 days.

(21) Appl. No.: 14/512,677

(22) Filed: Oct. 13, 2014

(65) Prior Publication Data

US 2016/0103349 A1 Apr. 14, 2016

(51) Int. Cl.
| | | |
|---|---|---|
| *G02F 1/1333* | (2006.01) | |
| *G02F 1/1335* | (2006.01) | |
| *G02F 1/13* | (2006.01) | |
| *G02F 1/1345* | (2006.01) | |

(52) U.S. Cl.
CPC ....... *G02F 1/133512* (2013.01); *G02F 1/1309* (2013.01); *G02F 1/13452* (2013.01); *G02F 1/13458* (2013.01)

(58) Field of Classification Search
USPC ......... 349/141, 139, 110, 42, 181, 147, 178, 349/111, 122, 123, 137, 143, 38, 46, 96
See application file for complete search history.

(56) References Cited

U.S. PATENT DOCUMENTS

| | | |
|---|---|---|
| 6,940,301 B2 | 9/2005 | Chen |
| 8,730,443 B2 | 5/2014 | Ohta et al. |
| 2013/0100391 A1 | 4/2013 | Wang et al. |
| 2013/0106813 A1 | 5/2013 | Hotelling et al. |
| 2013/0328051 A1 | 12/2013 | Franklin et al. |

*Primary Examiner* — Telly Green
(74) *Attorney, Agent, or Firm* — Treyz Law Group, P.C.; G. Victor Treyz; Zachary D. Hadd

(57) ABSTRACT

A display may have a liquid crystal layer sandwiched between a thin-film transistor layer and a color filter layer. An upper polarizer may be placed on top of the thin-film transistor layer. A lower polarizer may be placed under the color filter layer. Components may be bonded to bond pads on the inner surface of the thin-film transistor layer using anisotropic conductive film. Bond quality may be assessed by probing probe pads that are coupled to the bond pads or by visually inspecting the bond pads through the thin-film transistor layer. Opaque masking material in the inactive area may be provided with openings to accommodate the bond pads. Additional opaque masking material may be placed on the underside of the upper polarizer and on the upper surface of the thin-film transistor layer to block the openings from view following visual inspection.

14 Claims, 16 Drawing Sheets

DISPLAY WITH LOW REFLECTIVITY ALIGNMENT STRUCTURES

BACKGROUND

This relates generally to electronic devices, and more particularly, to electronic devices with displays.

Electronic devices often include displays. For example, cellular telephones and computers may have displays for presenting information to a user.

Liquid crystal displays contain a layer of liquid crystal material. Pixels in a liquid crystal display contain thin-film transistors and electrodes for applying electric fields to the liquid crystal material. The strength of the electric field in a pixel controls the polarization state of the liquid crystal material and thereby adjusts the brightness of the pixel.

Substrate layers such as color filter layers and thin-film transistor layers are used in liquid crystal displays. A thin-film transistor layer contains an array of the thin-film transistors and associated pixel electrodes that are used in controlling electric fields in the liquid crystal layer. A color filter layer contains an array of color filter elements such as red, blue, and green elements. The color filter layer provides the display with the ability to display color images.

In assembled displays, components are coupled to display substrate layers. For example, in a display in which the thin-film transistor layer forms the outermost display layer of the display, the thin-film transistor layer may have a region that extends past the edge of the color filter layer. Components such as flexible printed circuits and display driver integrated circuits may be mounted to bonding pads in this region using a material such as anisotropic conductive film (ACF).

Materials such as anisotropic conductive film are insulating before being compressed together between mating bonding pads. When pressure is applied in the region between mating pads, the film becomes conducting and forms a short circuit between the pads.

Anisotropic conductive films include particles that press into the pads during bonding. When a pad is formed on a transparent substrate, the metal layer that forms the pad can be viewed through the transparent substrate. When sufficient force is applied to a pair of mating contacts to form a satisfactory anisotropic conductive film bond, the particles in the anisotropic conductive film will tend to disrupt the metal layer. This disruption will lead to particle-shaped visual artifacts on the surface of the metal layer that is adjacent to the transparent substrate. By viewing the contacts through the substrate, the quality of the anisotropic conductive film bonds that have been formed can be evaluated. If the bonds do not appear satisfactory during inspection, the display may be scrapped or repaired.

To hide internal components from view in a display, the inactive border region of a display layer such as a thin-film transistor layer may be coated with an opaque material such as a black masking layer. The presence of the black masking layer may block viewing of the surface of the metal layer that is adjacent to the thin-film transistor layer substrate so that it is not possible to evaluate anisotropic conductive film bonds in the display.

It would therefore be desirable to be able to provide displays with improved structures for facilitating the evaluation of anisotropic conductive film bonds.

SUMMARY

A display may have a thin-film transistor layer formed from a layer of thin-film transistor circuitry on a substrate, a color filter layer, and a layer of liquid crystal material between the thin-film transistor layer and the color filter layer. An upper polarizer may be placed on top of the thin-film transistor layer. A lower polarizer may be placed under the color filter layer.

The thin-film transistor layer may have an edge that extends past the color filter layer. Components such as flexible printed circuits and integrated circuits may be bonded to bond pads on the inner surface of the thin-film transistor layer in the portion of the thin-film transistor layer that extends past the edge of the color filter layer. The surface on which the bond pads are formed may be located in an inactive area of the display. Bonds may be formed using anisotropic conductive film.

Bond quality may be assessed by direct electrical measurements. These measurements may be performed by probing pads on the thin-film transistor layer that are coupled to dummy bond pads on the mounted components. This allows resistance measurements or other electrical measurements to be made that are indicative of whether or not a satisfactory bond has been formed.

Bond quality may also be assessed by visually inspecting the bond pads through the thin-film transistor layer substrate. Opaque masking material may be provided on the thin-film transistor layer in the inactive area. The opaque masking material may be provided with openings to accommodate visual inspection of the bond pads. Additional opaque masking material may be placed on the underside of the upper polarizer and on the upper surface of the thin-film transistor layer to block the openings from view following visual inspection.

DETAILED DESCRIPTION

Electronic devices may include displays. The displays may be used to display images to a user. Illustrative electronic devices that may be provided with displays are shown in FIGS. 1, 2, 3, and 4.

Figure 1:
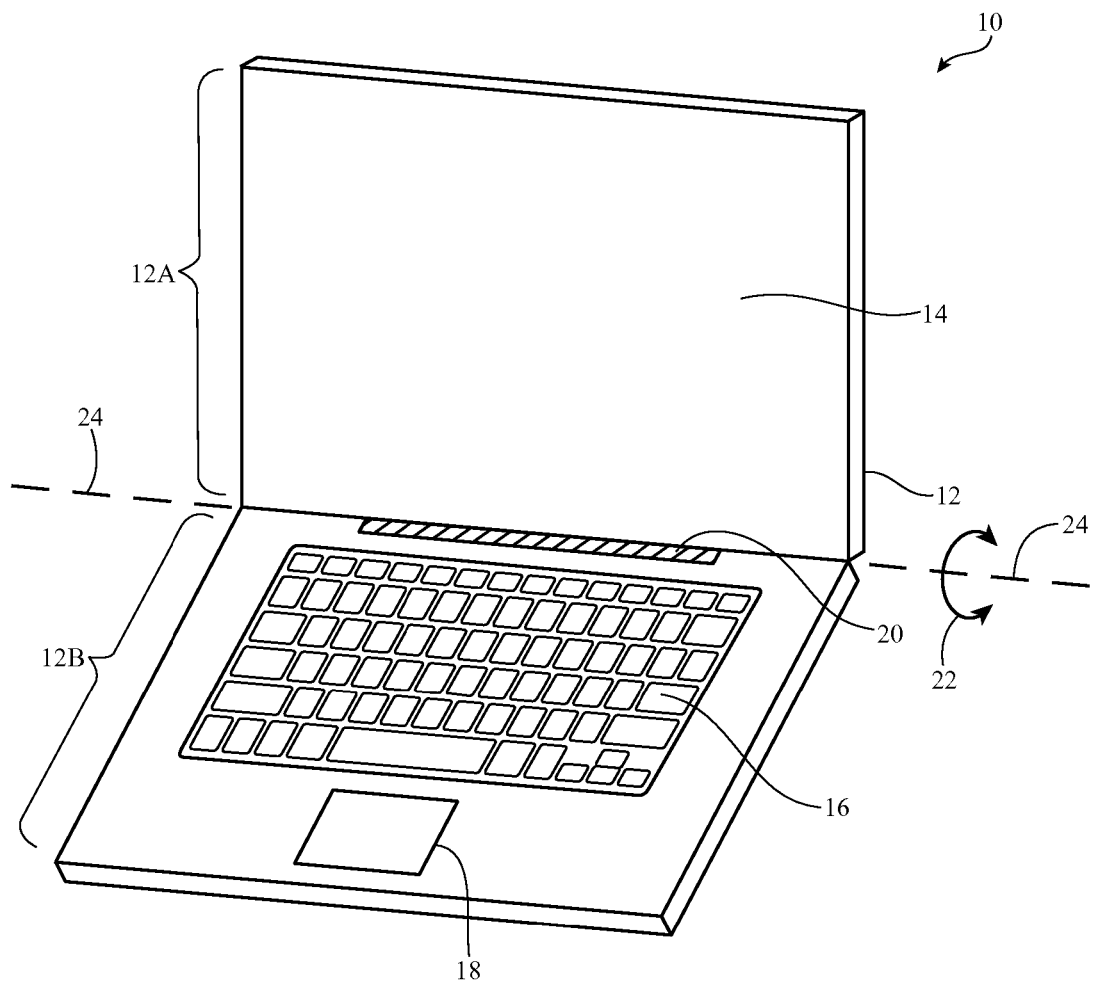
FIG. 1 is a perspective view of an illustrative electronic device such as a laptop computer with a display in accordance with an embodiment.

Illustrative electronic device 10 of FIG. 1 has the shape of a laptop computer having upper housing 12A and lower housing 12B with components such as keyboard 16 and touchpad 18. Device 10 may have hinge structures 20 that allow upper housing 12A to rotate in directions 22 about rotational axis 24 relative to lower housing 12B. Display 14 may be mounted in upper housing 12A. Upper housing 12A, which may sometimes be referred to as a display housing or lid, may be placed in a closed position by rotating upper housing 12A towards lower housing 12B about rotational axis 24.

Figure 2:
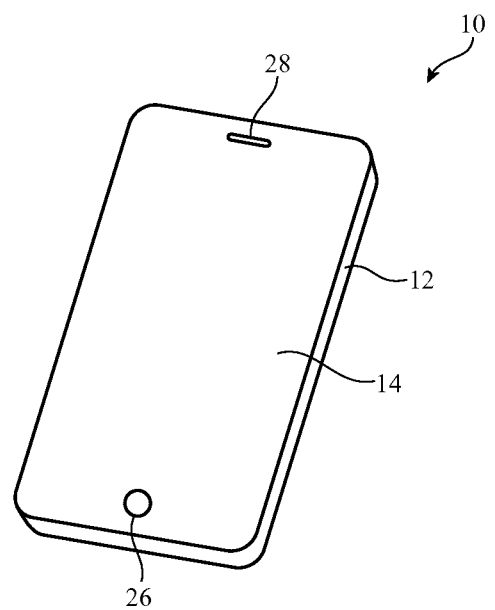
FIG. 2 is a perspective view of an illustrative electronic device such as a handheld electronic device with a display in accordance with an embodiment.

FIG. 2 shows how electronic device 10 may be a handheld device such as a cellular telephone, music player, gaming device, navigation unit, or other compact device. In this type of configuration for device 10, housing 12 may have opposing front and rear surfaces. Display 14 may be mounted on a front face of housing 12. Display 14 may, if desired, have openings for components such as button 26. Openings may also be formed in display 14 to accommodate a speaker port (see, e.g., speaker port 28 of FIG. 2).

Figure 3:
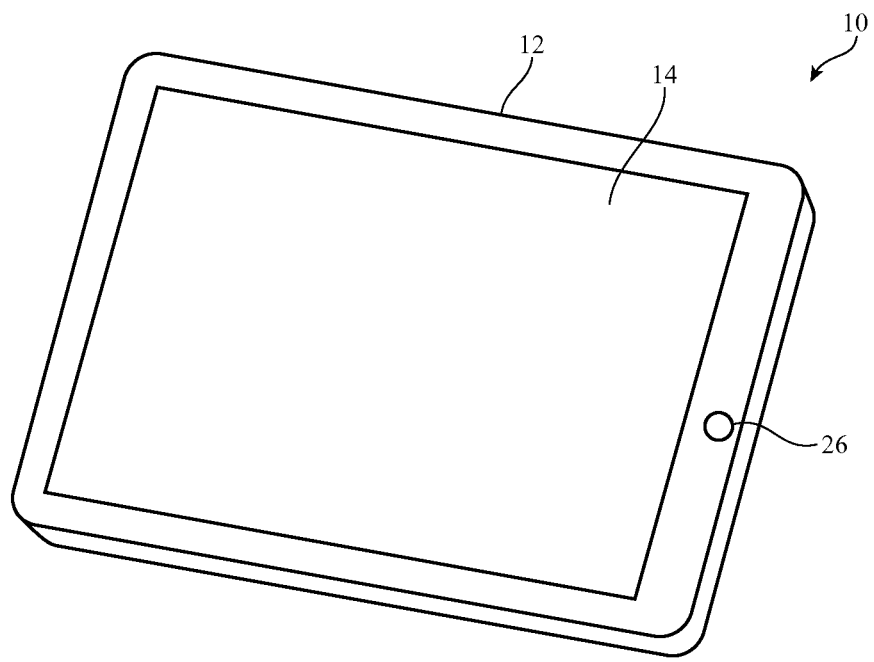
FIG. 3 is a perspective view of an illustrative electronic device such as a tablet computer with a display in accordance with an embodiment.

FIG. 3 shows how electronic device 10 may be a tablet computer. In electronic device 10 of FIG. 3, housing 12 may have opposing planar front and rear surfaces. Display 14 may be mounted on the front surface of housing 12. As shown in FIG. 3, display 14 may have an opening to accommodate button 26 (as an example).

Figure 4:
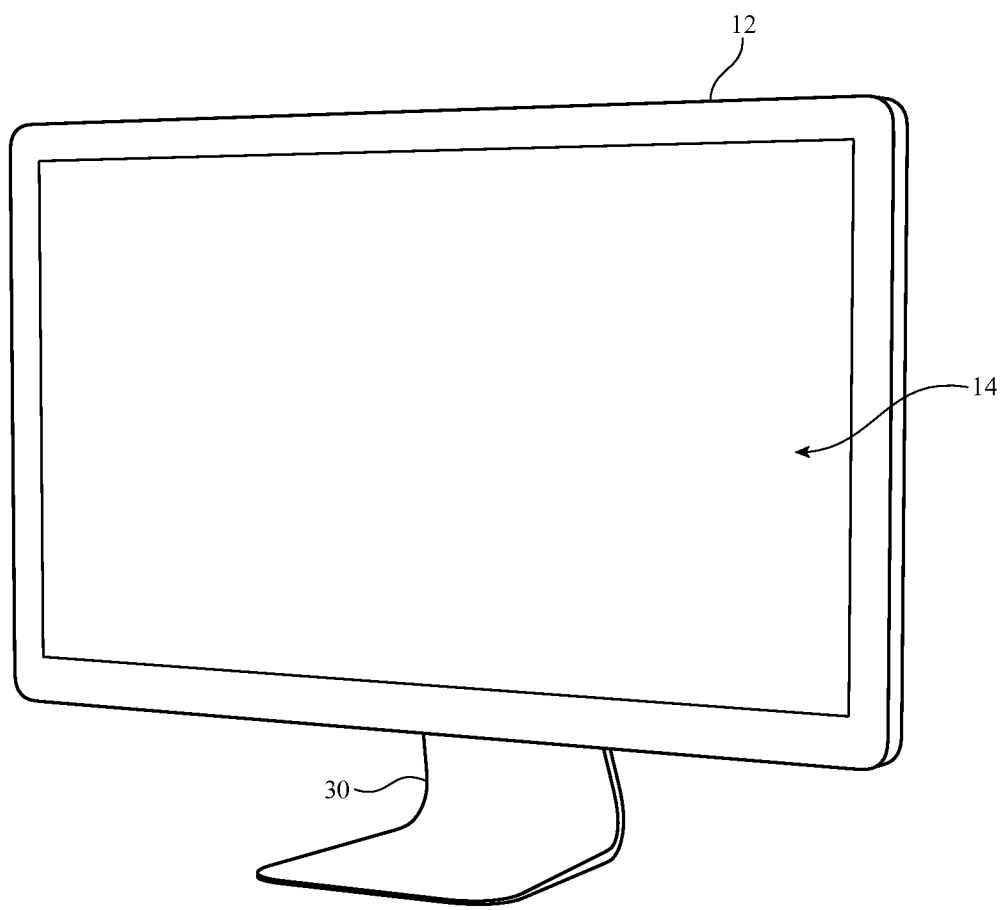
FIG. 4 is a perspective view of an illustrative electronic device such as a computer display with display structures in accordance with an embodiment.

FIG. 4 shows how electronic device 10 may be a computer display, a computer that has been integrated into a computer display, or a display for other electronic equipment. With this type of arrangement, housing 12 for device 10 may be mounted on a support structure such as stand 30 or stand 30 may be omitted (e.g., stand 30 can be omitted when mounting device 10 on a wall). Display 14 may be mounted on a front face of housing 12.

The illustrative configurations for device 10 that are shown in FIGS. 1, 2, 3, and 4 are merely illustrative. In general, electronic device 10 may be a laptop computer, a computer monitor containing an embedded computer, a tablet computer, a cellular telephone, a media player, or other handheld or portable electronic device, a smaller device such as a wrist-watch device, a pendant device, a headphone or earpiece device, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment.

Housing 12 of device 10, which is sometimes referred to as a case, may be formed of materials such as plastic, glass, ceramics, carbon-fiber composites and other fiber-based composites, metal (e.g., machined aluminum, stainless steel, or other metals), other materials, or a combination of these materials. Device 10 may be formed using a unibody construction in which most or all of housing 12 is formed from a single structural element (e.g., a piece of machined metal or a piece of molded plastic) or may be formed from multiple housing structures (e.g., outer housing structures that have been mounted to internal frame elements or other internal housing structures).

Display 14 may be a touch sensitive display that includes a touch sensor or may be insensitive to touch. Touch sensors for display 14 may be formed from an array of capacitive touch sensor electrodes, a resistive touch array, touch sensor structures based on acoustic touch, optical touch, or force-based touch technologies, or other suitable touch sensor components.

Display 14 for device 10 may include display pixels formed from liquid crystal display (LCD) components or other suitable image pixel structures.

A display cover layer may cover the surface of display 14 or a display layer such as a thin-film transistor layer or other portion of a display may be used as the outermost (or nearly outermost) layer in display 14. The outermost display layer may be formed from a transparent glass sheet, a clear plastic layer, or other transparent member.

Figure 5:
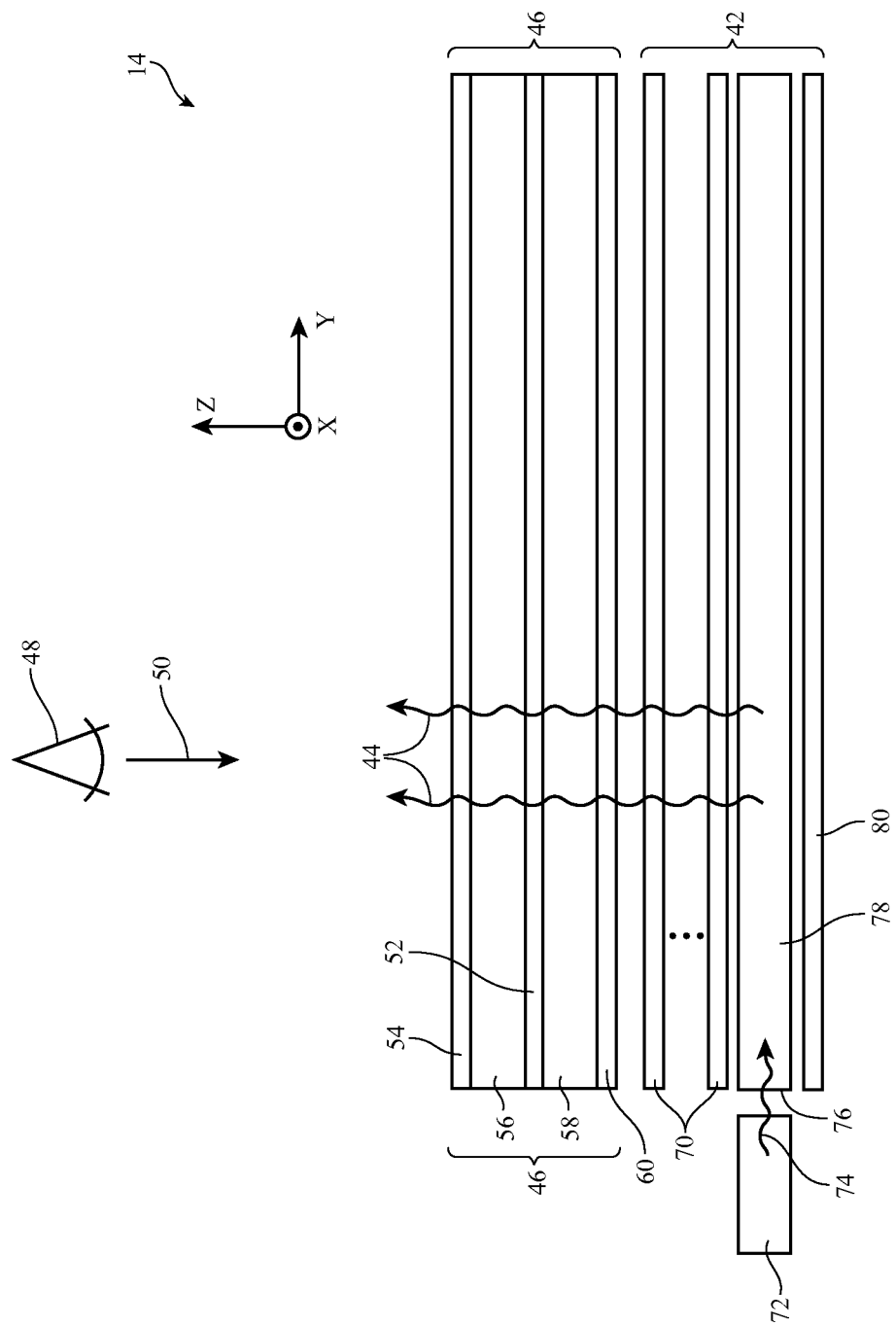
FIG. 5 is a cross-sectional side view of an illustrative display in accordance with an embodiment.

A cross-sectional side view of an illustrative configuration for display 14 of device 10 (e.g., for display 14 of the devices of FIG. 1, FIG. 2, FIG. 3, FIG. 4 or other suitable electronic devices) is shown in FIG. 5. As shown in FIG. 5, display 14 may include backlight structures such as backlight unit 42 for producing backlight 44. During operation, backlight 44 travels outwards (vertically upwards in dimension Z in the orientation of FIG. 5) and passes through display pixel structures in display layers 46. This illuminates any images that are being produced by the display pixels for viewing by a user. For example, backlight 44 may illuminate images on display layers 46 that are being viewed by user 48 in direction 50.

Display layers 46 may be mounted in chassis structures such as a plastic chassis structure and/or a metal chassis structure to form a display module for mounting in housing 12 or display layers 46 may be mounted directly in housing 12 (e.g., by stacking display layers 46 into a recessed portion in housing 12). Display layers 46 may form a liquid crystal display or may be used in forming displays of other types.

In a configuration in which display layers 46 are used in forming a liquid crystal display, display layers 46 may include a liquid crystal layer such a liquid crystal layer 52. Liquid crystal layer 52 may be sandwiched between display layers such as display layers 58 and 56. Layers 56 and 58 may be interposed between lower polarizer layer 60 and upper polarizer layer 54.

Layers 58 and 56 may be formed from transparent substrate layers such as clear layers of glass or plastic. Layers 56 and 58 may be layers such as a thin-film transistor layer and/or a color filter layer. Conductive traces, color filter elements, transistors, and other circuits and structures may be formed on the substrates of layers 58 and 56 (e.g., to form a thin-film transistor layer and/or a color filter layer). Touch sensor electrodes may also be incorporated into layers such as layers 58 and 56 and/or touch sensor electrodes may be formed on other substrates.

With one illustrative configuration, layer 56 may be a thin-film transistor layer that includes an array of thin-film transistors and associated electrodes (display pixel electrodes) for applying electric fields to pixel-sized portions of liquid crystal layer 52 and thereby displaying images on display 14. Layer 58 may be a color filter layer that includes an array of color filter elements for providing display 14 with the ability to display color images. If desired, upper layer 56 may be a color filter layer and lower layer 58 may be a thin-film transistor layer. Another illustrative configuration involves forming color filter elements and thin-film transistor circuits with associated pixel electrodes on a common substrate. This common substrate may be the upper substrate or may be the lower substrate and may be used in conjunction with an opposing glass or plastic layer (e.g., a layer with or without any color filter elements, thin-film transistors, etc.) to contain liquid crystal layer 52. Illustrative configurations for display 14 in which layer 56 is a thin-film transistor layer and layer 58 is a color filter layer are sometimes described herein as an example.

During operation of display 14 in device 10, control circuitry (e.g., one or more integrated circuits on a printed circuit) may be used to generate information to be displayed on display 14 (e.g., display data). The information to be displayed may be conveyed to one or more display driver integrated circuits and other display driver circuitry (e.g., thin-film gate drivers, etc.) using a signal path such as a signal path formed from conductive metal traces in a rigid or flexible printed circuit.

Backlight structures 42 may include a light guide plate such as light guide plate 78. Light guide plate 78 may be formed from a transparent material such as clear glass or plastic. During operation of backlight structures 42, a light source such as light source 72 may generate light 74. Light source 72 may be, for example, an array of light-emitting diodes. If desired, light sources such as light source 72 may be located along multiple edges of light guide plate 78.

Light 74 from light source 72 may be coupled into edge surface 76 of light guide plate 78 and may be distributed in dimensions X and Y throughout light guide plate 78 due to the principal of total internal reflection. Light guide plate 78 may include light-scattering features such as pits or bumps. The light-scattering features may be located on an upper surface and/or on an opposing lower surface of light guide plate 78.

Light 74 that scatters upwards in direction Z from light guide plate 78 may serve as backlight 44 for display 14. Light 74 that scatters downwards may be reflected back in the upward direction by a reflective film such as reflector 80. Reflector 80 may be formed from a reflective material such as a reflective layer of white plastic or other reflective materials.

To enhance backlight performance for backlight structures 42, backlight structures 42 may include optical films 70. Optical films 70 may include one or more diffuser layers for helping to homogenize backlight 44 and thereby reduce hotspots and one or more prism films (also sometimes referred to as turning films or brightness enhancement films) for collimating backlight 44. Compensation films for enhancing off-axis viewing may be included in optical films 70 or may be incorporated into other portions of display 14 (e.g., in polarizer layers such as layers 54 and/or 60). Optical films 70 may overlap the other structures in backlight unit 42 such as light guide plate 78 and reflector 80. For example, if light guide plate 78 has a rectangular footprint in the X-Y plane of FIG. 5, optical films 70 and reflector 80 may have a matching rectangular footprint.

Figure 6:
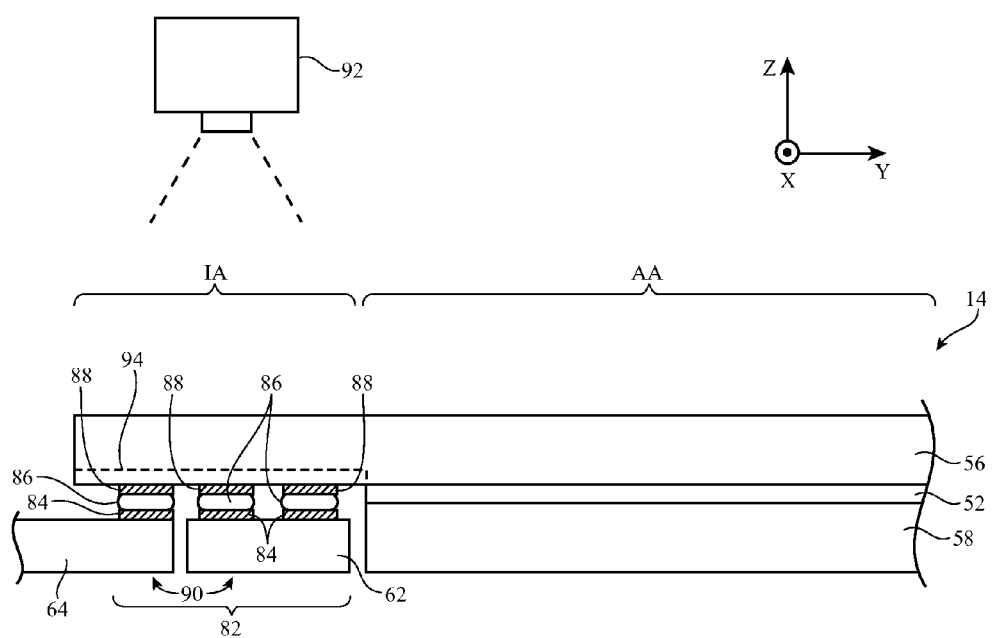
FIG. 6 is a cross-sectional side view of an illustrative display having a thin-film transistor layer region that overhangs the edge of a color filter layer in accordance with an embodiment.

As shown in the cross-sectional side view of FIG. 6, one or more components 90 may be mounted to thin-film transistor layer 56. Components 90 may include one or more display driver integrated circuits such as display driver integrated circuit 62 and structures such as flexible printed circuit 64.

One of the peripheral edges of thin-film transistor layer 56 may extend past the edge of color filter layer 58, creating overhanging ledge region 82. In region 82, metal traces may be exposed and may be patterned to form bond pads 88 (sometimes referred to as contacts, thin-film transistor layer bond pads, or substrate bond pads). The metal layer in which bond pads 88 are formed may be, for example, a gate metal layer that is also used in forming gates for thin-film transistors in thin-film transistor layer 56. Other metal layers may also be present in the thin-film transistor circuitry of thin-film transistor layer 56.

Electrical components 90 may be attached to thin-film transistor layer bond pads 88 using conductive material 86. Conductive materials that may be used in forming bonds in display 14 include solder and conductive adhesive. Configurations in which conductive material 86 is a conductive adhesive such as anisotropic conductive film are sometimes described herein as an example.

Display driver integrated circuits such as display driver integrated circuit 62 may have bond pads 84 that mate with corresponding bond pads 88 on the lower (inner) surface of thin-film transistor layer 56. Flexible printed circuit 64 may be used to route signals between a logic board in device 10 and display 14. Flexible printed circuit 64 may have copper or other metal that forms bond pads 84 that mate with corresponding bond pads 88 on thin-film transistor layer. Because pads 84 are associated with components (e.g., flexible printed circuit 64, integrated circuit 62, etc.), pads 84 may sometimes be referred to as component bond pads or component contacts.

Before anisotropic conductive film bonds are formed (e.g., before the bonds formed from material 86 of FIG. 6 have been formed), the anisotropic conductive film is not conductive. The anisotropic conductive film is locally rendered conductive wherever sufficient pressure is applied to transform the anisotropic conductive film into conductive material (e.g., between mating bond pads such a upper pads 88 and opposing lower pads 84 of FIG. 6). When compressed together with sufficient force, any intervening anisotropic conductive film will be rendered conductive and will form material 86 for a satisfactory low resistance bond between pads 84 and 88. In the laterally intervening spaces between pads, the film is not sufficiently compressed and will remain insulating, thereby preventing undesired shorts between adjacent bond pads.

In order to properly mount components 90 such as flexible printed circuit cable 64 and display driver integrated circuit 62 to thin-film transistor layer 56, sufficient pressure should generally be applied to locally crush the material in anisotropic conductive film. Particles in the film may create particle-shaped deformities in the undersides of the bond pads that can be viewed through the substrates on which the bond pads are formed. The presence of these visible artifacts, which are indicative of satisfactory anisotropic conductive film bonds, can be detected through a transparent substrate using visual inspection equipment such as camera 92.

To hide internal structures in device 10 from view (e.g., components 90), it may sometimes be desirable to form opaque masking layers on portions of the layers in display 14. As shown in FIG. 6, for example, opaque mask 94 may be formed in inactive border area IA of display 14. Mask 94 may be formed from a black masking material or other opaque material. In active area AA of display 14, the mask may be patterned to form a grid with openings that accommodate the array of pixels in display 14. In inactive area IA, the mask serves to block components 90 and other structures from view from the exterior of device 10.

Figure 7:
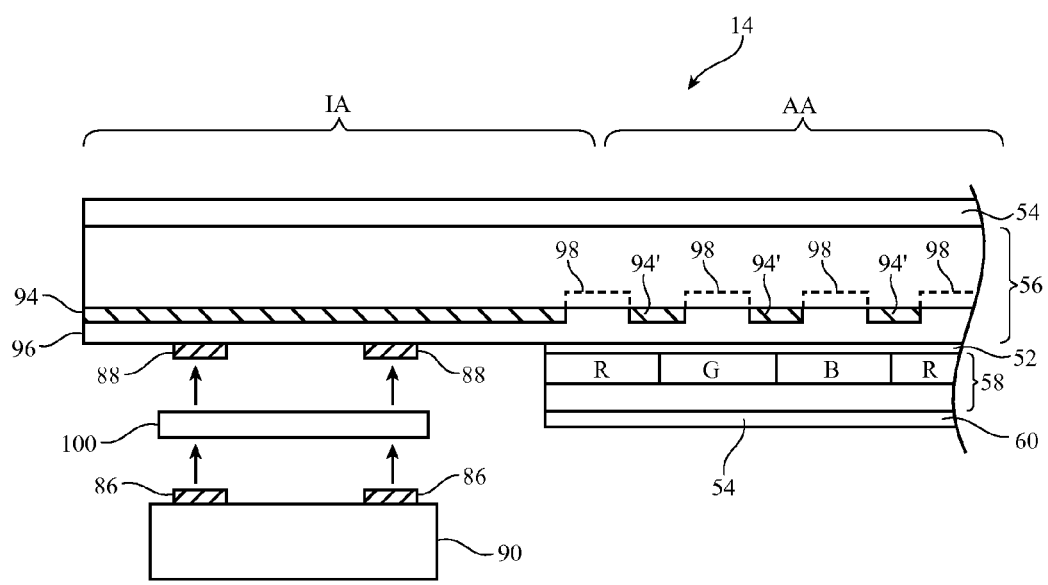
FIG. 7 is a side view of an illustrative display to which a component is being mounted using anisotropic conductive film bonds in accordance with an embodiment.

FIG. 7 is a cross-sectional side view of an edge portion of display 14. In the illustrative configuration of FIG. 7, display 14 has a central active area AA surrounded by an inactive border region IA. In central region AA, pixels form images for a user. The lower surface of thin-film transistor layer 56 may be coated with an opaque masking layer such as layer 94. Layer 94 may form an opaque border in inactive area IA. In active area AA, layer 94 may be patterned to form a matrix 94' having openings aligned with the pixels of the display. Each pixel may have thin-film transistor circuitry and thin-film electrodes 98 on the lower surface of layer 56 and a corresponding color filter element (e.g., a red element R, green element G, or blue element B) on the opposing upper surface of color filter layer 58.

Dielectric layers such as spin-on-glass layer 96 may form a coating over opaque masking layer 94. Bond pads 88 may be formed on layer 96. Anisotropic conductive film 100 may be deposited over pads 88. Component 90 may then be positioned so that component bond pads 84 are aligned with thin-film transistor layer bond pads 88. Once aligned, component 90 can be pressed towards layer 56. This compresses the portions of film 100 that lie between opposing pads 88 and 84 and thereby electrically and mechanically bonds each pad 88 to a corresponding one of pads 84.

Opaque layer 94 and the other opaque masking materials in display 14 may be formed from black ink, white ink, metal, metal oxides, black, white, or other colors of photoimageable polymer or other polymers, dielectric material, colored ink (e.g., red ink, etc.), other opaque layers of material, or combinations of these opaque materials.

In the absence of openings in layer 94, visual inspection equipment 92 will be unable to view pads 88, so it will not be possible to visually ascertain whether the bonds that have been formed are satisfactory. Accordingly, in the absence of openings in layer 94, probe contacts may be formed that allow direct electrical measurement of the quality of the bonds being formed.

Figure 8:
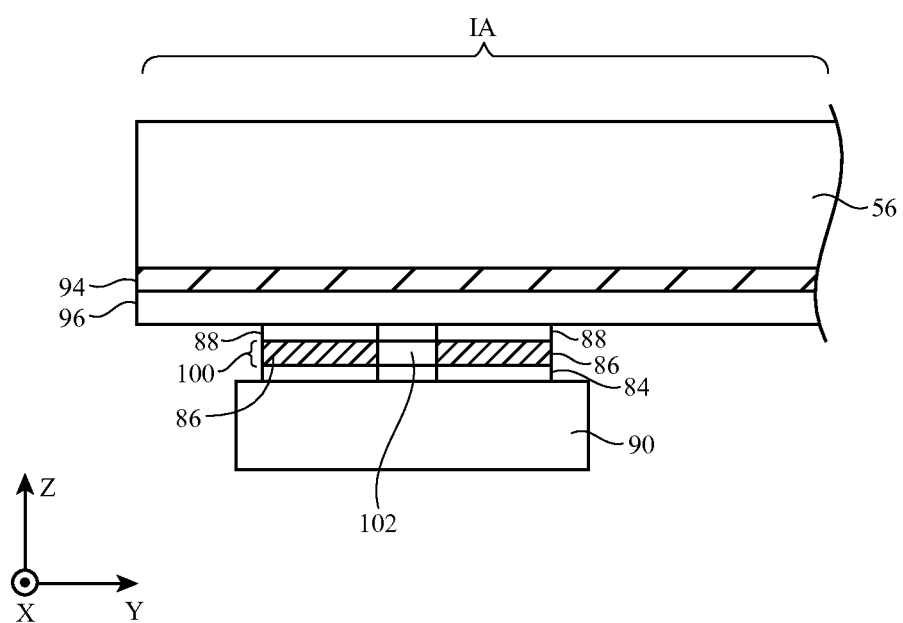
FIG. 8 is a side view of an illustrative display having probe pads for facilitating direct contact resistance measurements to evaluate anisotropic conductive film bonds in accordance with an embodiment.

Consider, as an example, the arrangement of FIG. 8. In this scenario, layer 94 is devoid of openings in inactive area IA, so components 90 and the bonds formed between pads 88 and 84 are not visible through layer 56. As illustrated in FIG. 8, portions of film 100 such as portion 102 that have not been compressed between pads 88 and 84 will remain insulating, whereas portions of film 100 that have been compressed between mating pads 88 and 84 will be conducting (i.e., these regions will form conductive material 86). To assess whether bonds have been formed successfully, metal structures may be patterned on component 90 and/or layer 56 to facilitate electrical bond quality measurements.

Figure 9:
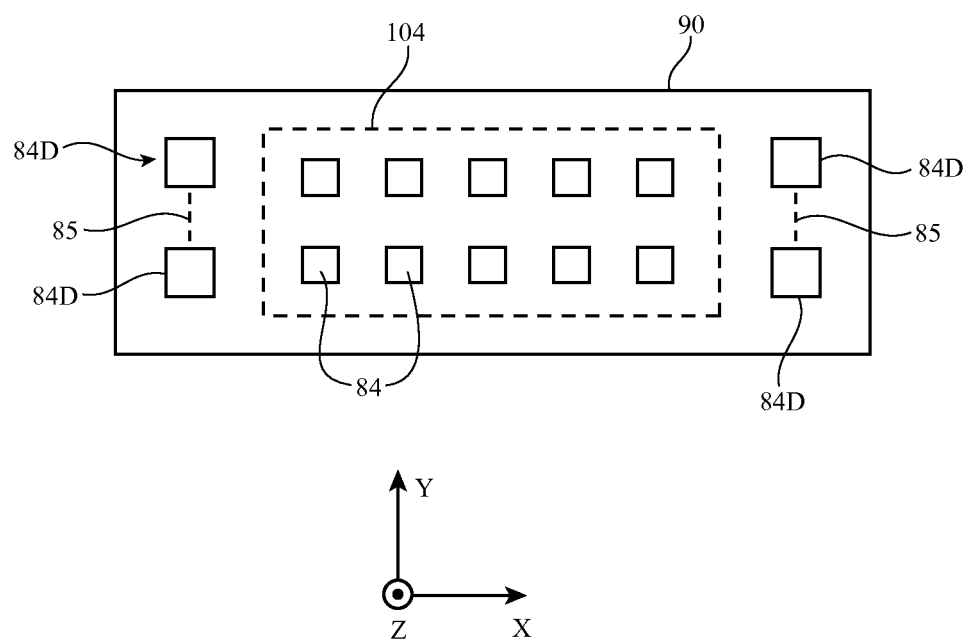
FIG. 9 is a top view of an illustrative component having dummy bond pads that are used when measuring anisotropic conductive film bond quality in accordance with an embodiment.
Figure 10:
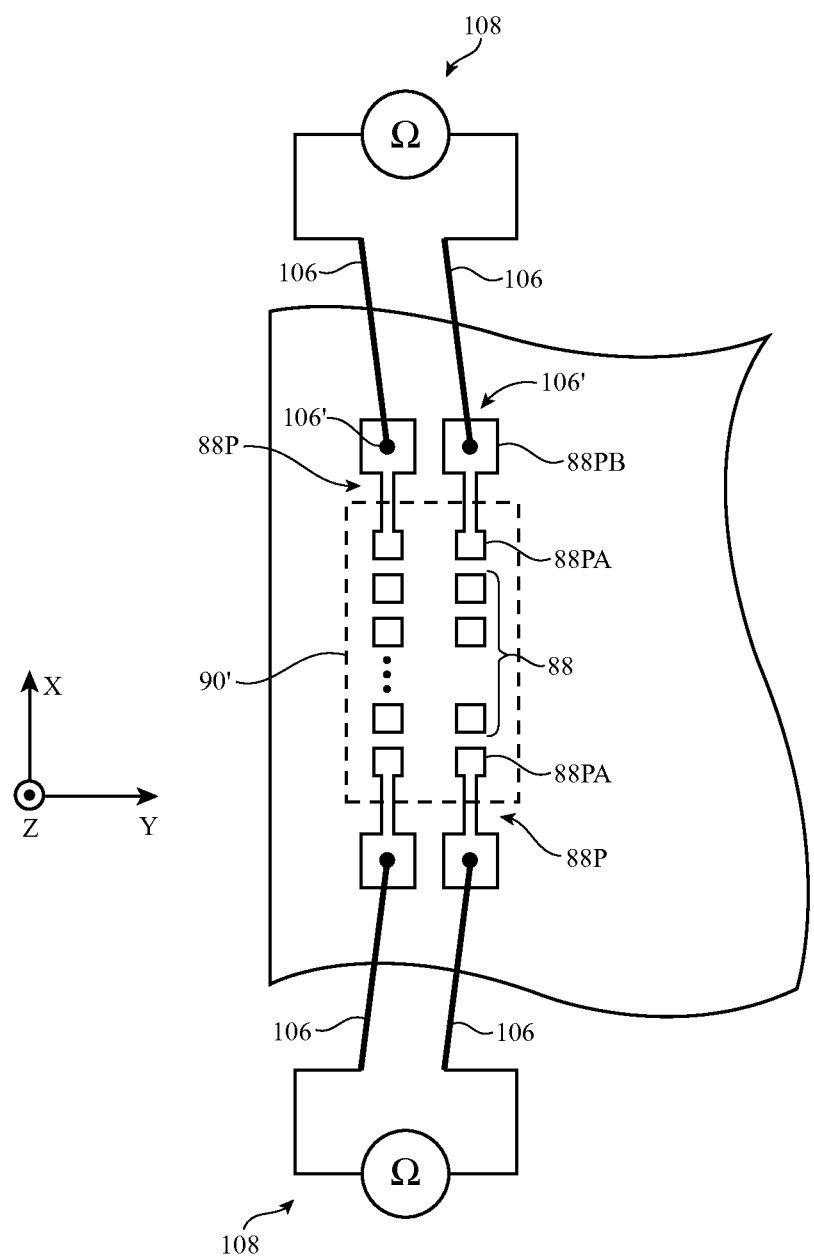
FIG. 10 is a top view of an illustrative display layer having bond pads that mate with the dummy bond pads of FIG. 9 and that have probe pad portions to which probes are connected during bond quality measurements in accordance with an embodiment.

FIG. 9 is a top view of bond pads 84 on the surface of component 90. In region 104, circuitry in component 90 (e.g. flexible printed circuit traces, transistor circuitry in an integrated circuit, etc.) may be connected to bond pads 84. In one or more other locations of component 90, dummy bond pads 84D are formed. Pairs of pads 84D may be coupled together electrically through conductive paths in component 90 such as paths 85. FIG. 10 is a view of the lower surface of layer 56 showing how layer 56 may have mating bond pads 88PA. Component 90 is mounted to layer 56 in region 90'. Bond pads 88 mate with respective bond pads 84 (FIG. 9). Pad structures 88P include bond pads 88PA and probe pads such as probe pad portions 88PB that are electrically coupled to pads 88PA. Probe pad portions 88PB are uncovered by component 90. This allows probe tips 106' of probes 106 to be placed into contact with probe pads 88PB during testing. Ohm-meters or other electrical measurement equipment 108 may be use to measure the quality of the bonds formed between pads 88A and pads 84D, because an electrical circuit is formed that passes through probes 106, pads 88P, conductive material 86, pads 84D, and paths 85. If the bonds between pads 88PA and pads 84D are poor, the resistance measured by equipment 108 will be high. If a low contact resistance is measured using equipment 108, it can be concluded that satisfactory bonds have been formed between pads 88PA and pads 84D (and therefore satisfactory bonds have been formed between pads 88 and pads 84 that are coupled to the circuitry of component 90).

Figure 11:
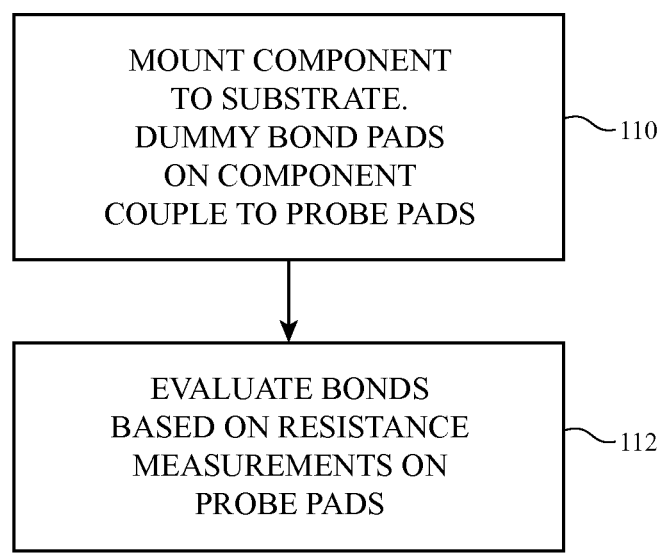
FIG. 11 is a flow chart of illustrative steps involved in mounting a component to a display layer and in measuring bond resistances to evaluate bond quality in accordance with an embodiment.

Illustrative steps involved in using dummy contact structures in assessing bond quality are shown in FIG. 11. At step 110, component 90 may be mounted to layer 56. Dummy bond pads 84D on component 90 form bonds with pads 88P on layer 56 using anisotropic conductive film.

At step 112, equipment 108 may be used to probe pad portions 88PB of pad structures 88P and make electrical measurements such as resistance measurements that are indicative of the quality of the bonds that have been formed. If bond quality is satisfactory, display 14 may be incorporated into a device such as device 10. If bond quality is unsatisfactory, display 14 may be scrapped or repaired.

Figure 12:
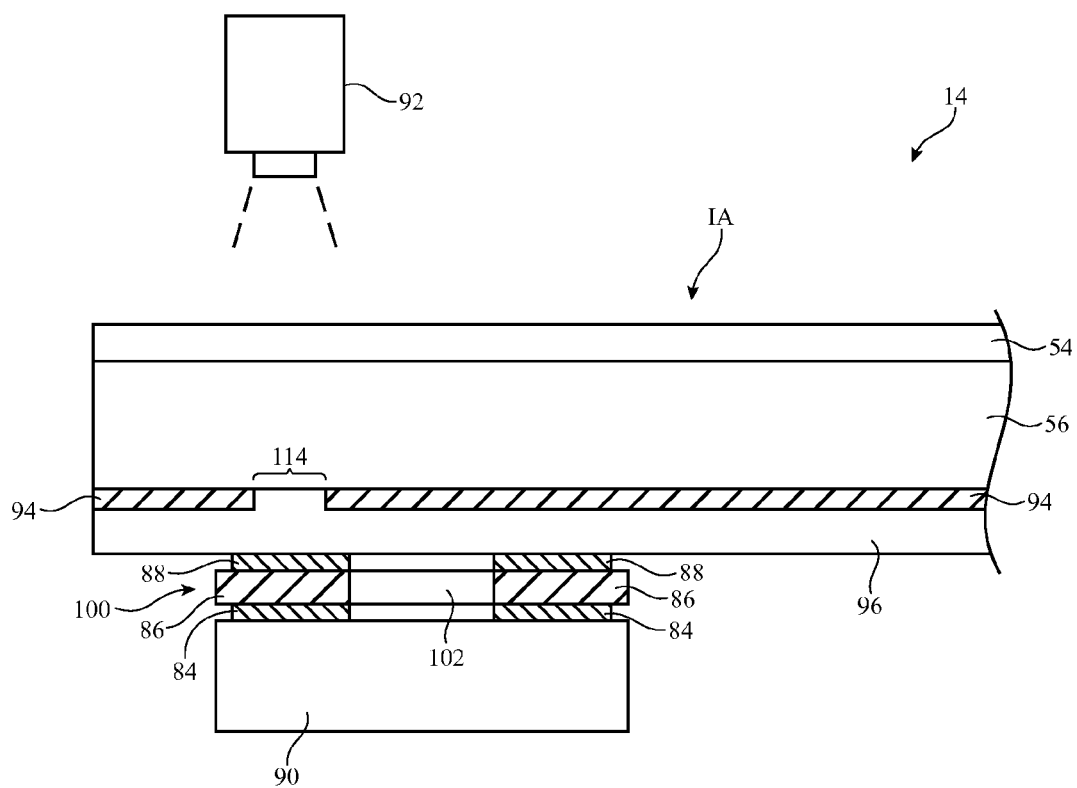
FIG. 12 is a side view of a display having a masking layer opening to facilitate visual inspection of a bond in accordance with an embodiment.

The illustrative configuration of FIG. 12 shows how one or more openings such as opening 114 may be formed in alignment with pads 88. This allows camera 92 to visually inspect pads 88 through polarizer 54 and layer 56 to assess bond quality. The visibility of openings 114 by a user of device 10 may be minimized when openings 114 are small. Pads 88 and 84 may be 20 microns wide (e.g., pads 88 and 84 may have lateral dimensions of 10-30 microns, more than 7 microns, less than 25 microns, less than 100 microns, etc.). Openings 114 may have comparable lateral dimensions (e.g., 10-30 microns, more than 7 microns, less than 25 microns, less than 100 microns, etc.). As an example, if pad 88 is a 20 micron by 20 micron square, opening 114 may be a 24 micron by 24 micron opening that is aligned with pad 88 (i.e., opening 114 may overlap pad 88). Other sizes may be used for openings such as opening 114 if desired. Sizes in which opening 114 are not visible to the naked eye of the user of device 10 may help improve the appearance of device 10. Sizes that are close to 1 mm are generally visible. Sizes that are close to 10-30 microns will be invisible. Other sizes may be used, if desired.

Figure 13:
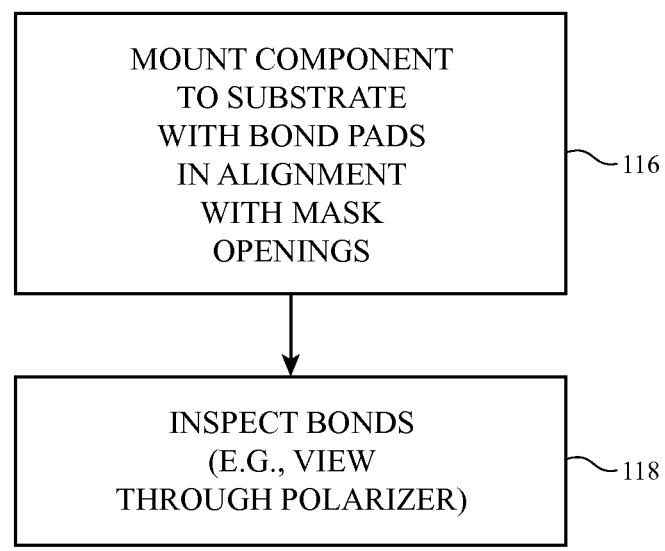
FIG. 13 is a flow chart of illustrative steps involved in forming bonds and evaluating bond quality using masking layer openings of the type shown in FIG. 12 in accordance with an embodiment.

FIG. 13 is a flow chart of illustrative steps involved in assessing bond quality using openings such as opening 114 in opaque masking layer 94 in inactive area IA of display 14 of FIG. 12. At step 116, components 90 may be mounted to the lower surface of layer 56 using anisotropic conductive film. Bonds are formed between bonding pads 84 and mating bonding pads 88.

At least some of the bond pads on layer 56 are in alignment with openings 114 in layer 94, which allows camera 92 to inspect the bonds formed with these bond pads at step 118. During the operations of step 118, the surface of pads 88 that is in contact with the lower (inner) surface of layer 56 may be inspected to determine whether the anisotropic conductive film has been sufficiently compressed to form a satisfactory electrical bond connection between pads 88 and 84.

Figure 14:
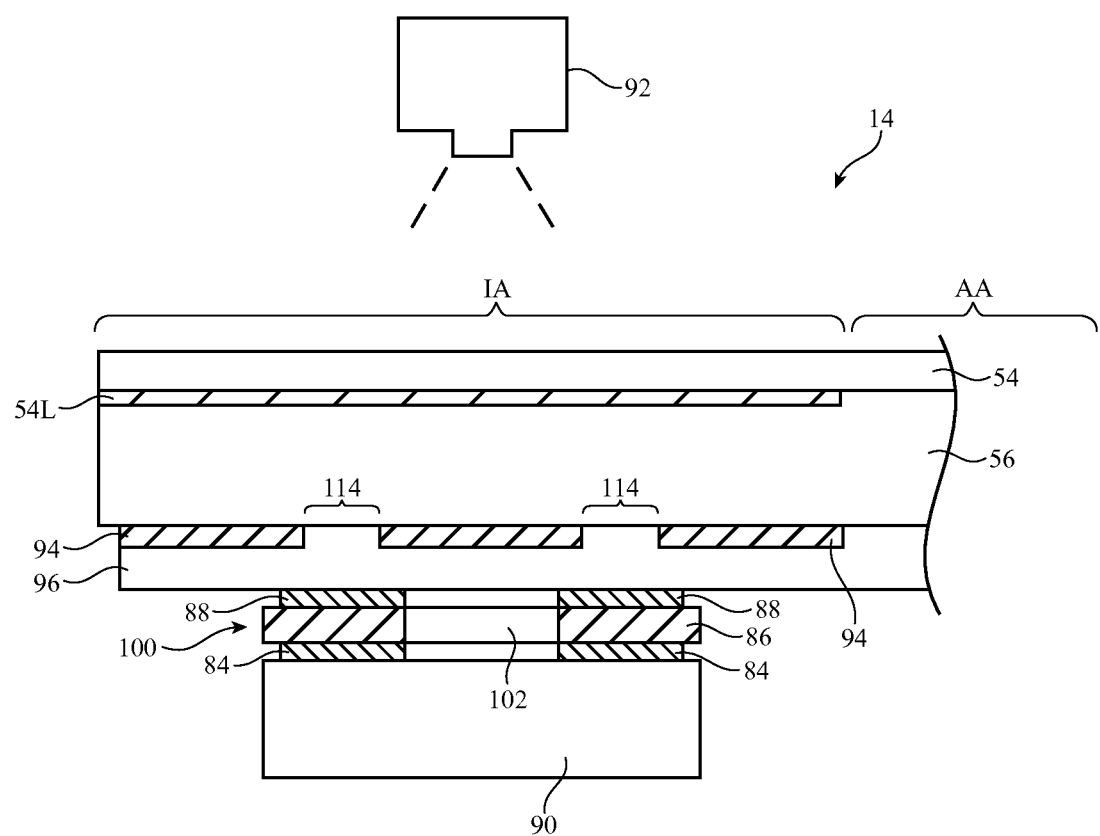
FIG. 14 is a side view of a display in which an opaque layer on the underside of an upper polarizer has been used to hide making layer openings used to visually evaluate bonds in accordance with an embodiment.

In the illustrative arrangement of FIG. 14, openings 114 in opaque masking layer 94 in inactive area IA may be used to permit camera 92 to view the bonds formed between bond pads 88 and 84 before polarizer layer 54 is attached to the upper surface of layer 56. After visual inspection of the bonds has been performed, polarizer layer 54 may be attached to display 14. The underside of layer 54 may be coated with an opaque masking material such as opaque layer 54L. Opaque layer 54L may, for example, form a rectangular ring-shaped border that runs around all four edges of a rectangular display (as an example). Layer 54L may have a shape that overlaps openings 114. Because layer 54L is formed from a material that is opaque, openings 114 will be hidden from view after polarizer layer 54 is attached to display 14. In configurations in which layer 54L is sufficiently opaque to serve as the opaque border layer for display 14, the amount of opaque material 94 in inactive area IA may be reduced (e.g., to allow more visual inspection of bonds with pads 88, etc.).

Figure 15:
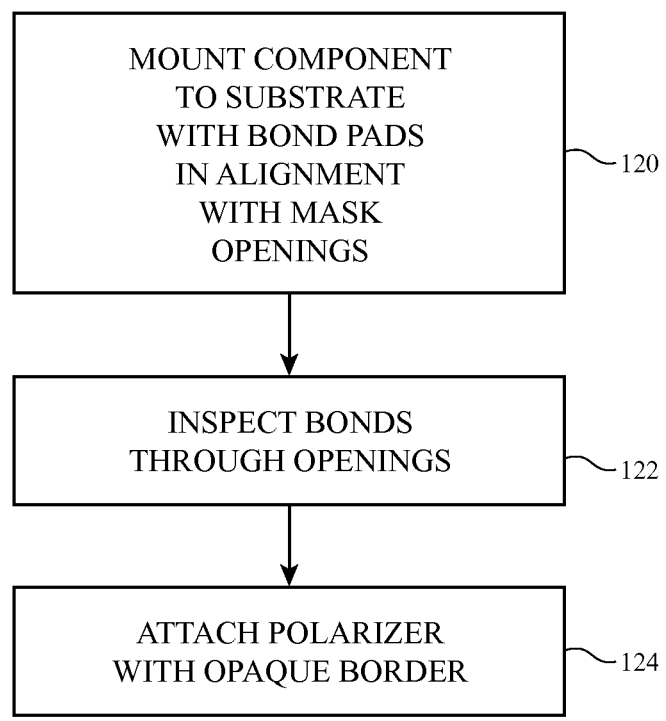
FIG. 15 is a flow chart of illustrative steps involved in mounting components to a display and evaluating bond quality before covering the display with an upper polarizer with an opaque border of the type shown in FIG. 14 in accordance with an embodiment.

FIG. 15 is a flow chart of illustrative steps involved in inspecting bonds in a display formed using structures of the type shown in FIG. 14. At step 120, components 90 may be mounted to layer 56 so that bond pads 84 mate with bond pads 88. Openings 114 are aligned with pads 88, so camera 92 can be used to inspect the bonds formed with pads 88 at step 122. During the inspection operations of step 122, camera 92 may view pads 88 through transparent layer 56. Polarizer layer 54 can be added to display 14 after visual inspection (step 124) so that the opaque material of layer 54L covers openings 114 and blocks openings 114 (and the portions of pads 88 that are visible in openings 114) from view.

Figure 16:
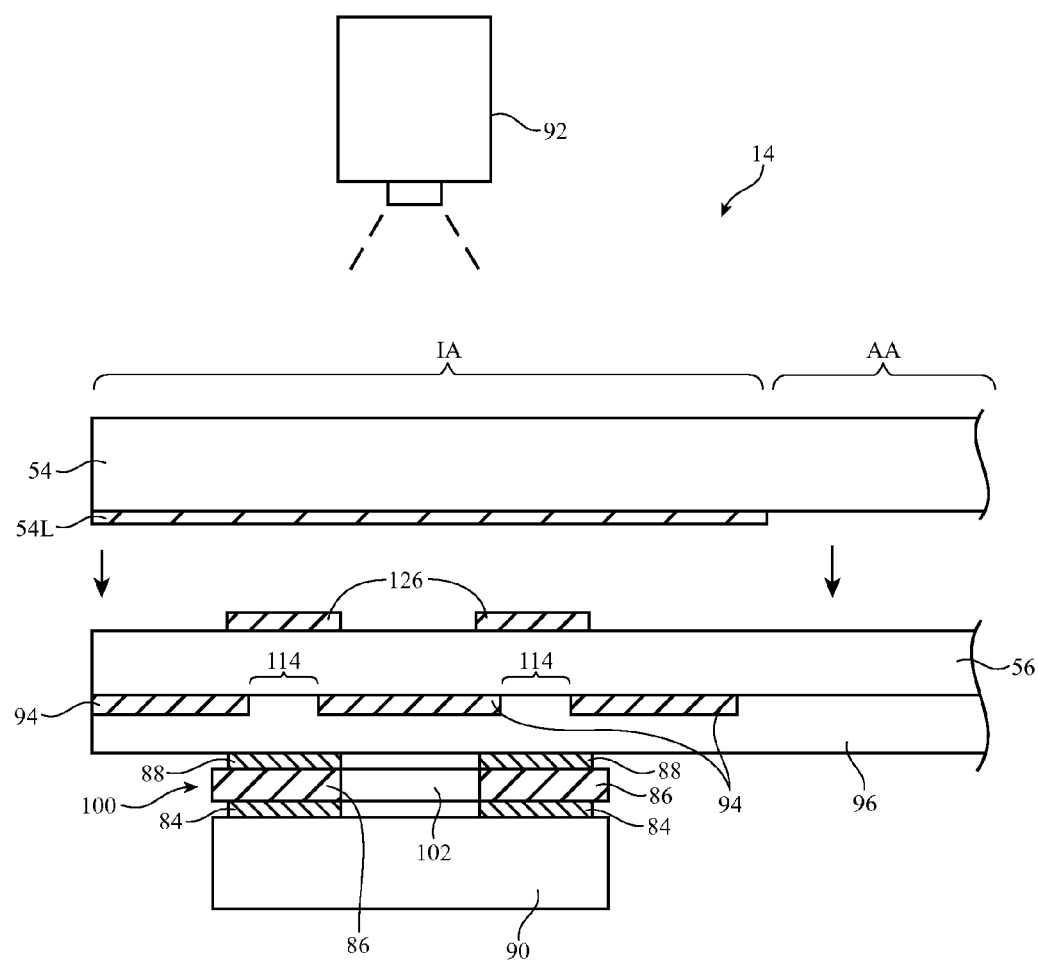
FIG. 16 is a side view of a display in which the upper surface of a display layer such as a thin-film transistor layer substrate has been coated with opaque material that overlap openings in a masking layer on an opposing lower surface before covering the display layer with a polarizer layer in accordance with an embodiment.

Another illustrative technique for covering openings 114 is shown in FIG. 16. With this type of arrangement, a patterned coating of opaque material 126 on the upper (outer) surface of thin-film transistor layer 56 is used to cover openings 114 after the bonds formed between pads 88 and 84 have been visually inspected. Material 126 may be opaque ink (e.g., black ink, white ink, colored ink, etc.) or may be other opaque material. Material 126 may be deposited in a layer that covers all of inactive area IA or may be deposited in dots or other patterned shapes that cover openings 114 without covering all of inactive area IA (e.g., an arrangement of the types shown in FIG. 16). Layer 54L on the lower surface of upper polarizer 54 may be used to help hide openings 114 and the structures formed form material 126 on layer 56 from view or layer 54L may be omitted.

Figure 17:
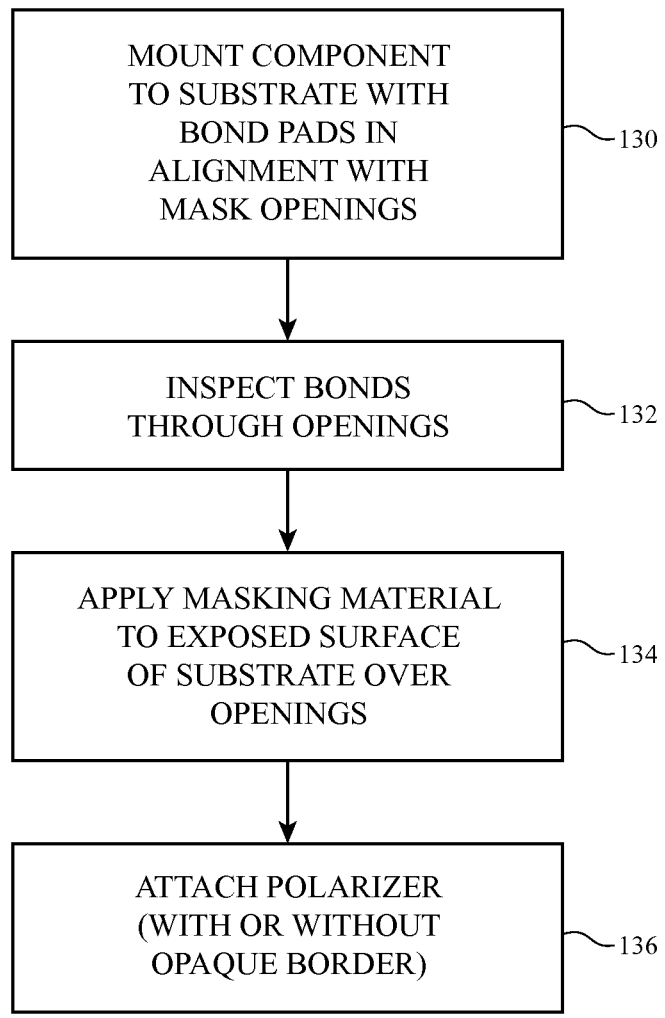
FIG. 17 is a flow chart of illustrative steps involved in mounting components to a display layer and evaluating bond quality before covering the upper surface of the display layer with the opaque material as described in connection with FIG. 16 in accordance with an embodiment.

FIG. 17 is a flow chart of illustrative steps involved in inspecting bonds in a display formed using structures of the type shown in FIG. 16. At step 130, components 90 may be mounted to layer 56 so that bond pads 84 mate with bond pads 88. Openings 114 in opaque masking layer 94 are aligned with pads 88, so camera 92 can be used to inspect the bonds formed with pads 88 at step 132. During the inspection operations of step 132, camera 92 may view pads 88 through transparent layer 56. At step 134, a coating of opaque material 126 may be deposited (e.g., using ink jet printing, screen printing, spraying, pad printing, or other suitable coating techniques for depositing a layer of opaque material on layer 56). Material 126 may overlap openings 114 so that openings 114 will be hidden from view by a user of device 10. After applying material 126 to the upper surface of layer 56 over openings 114, polarizer layer 54 can be attached to display 14 at step 136 (e.g., by mounting polarizer layer 54 to the upper surface of layer 56). Layer 54L on the lower surface of polarizer layer 54 may help cover openings 114 or layer 54L may be omitted.

The foregoing is merely illustrative and various modifications can be made by those skilled in the art without departing from the scope and spirit of the described embodiments. The foregoing embodiments may be implemented individually or in any combination.

What is claimed is:

1. A display, comprising:
    an upper polarizer;
    a lower polarizer;
    first and second substrate layers between the upper and lower polarizers;
    a layer of liquid crystal material between the first and second substrate layers, wherein the first substrate layer is interposed between the layer of liquid crystal material and the upper polarizer;
    a bond pad on a surface of the first substrate layer;
    a component having a bond pad that is bonded to the bond pad on the first substrate layer using an anisotropic conductive film bond; and
    an opaque masking layer on the surface of the first substrate layer, wherein the opaque masking layer has an opening and wherein the bond pad is positioned in the opening so that the bond pad can be visually inspected through the upper polarizer, the first substrate layer, and the opening.

2. The display defined in claim 1 wherein the first substrate layer comprises a thin-film transistor layer.

3. The display defined in claim 2 wherein the second substrate layer comprises a color filter layer.

4. The display defined in claim 3 wherein the thin-film transistor layer and color filter layer form an array of pixels in an active area that is bordered by an inactive area without any pixels and wherein the opaque masking layer has a first portion in the inactive area in which the opening is formed and has a second portion with pixel openings in the active area.

5. A display, comprising:
    an upper polarizer;
    a lower polarizer;
    first and second substrate layers between the upper and lower polarizers;
    a layer of liquid crystal material between the first and second substrate layers, wherein the first substrate layer is interposed between the layer of liquid crystal material and the upper polarizer and wherein the first substrate has opposing first and second surfaces;

substrate bond pads on the first surface of the first substrate layer;

a component having component bond pads that are each bonded to a respective one of the substrate bond pads with a respective anisotropic conductive film bond;

an opaque masking layer on the first surface of the first substrate layer, wherein the opaque masking layer has openings in which the substrate bond pads are located; and an opaque material on the upper polarizer, wherein the opaque material is interposed between the second surface of the first substrate layer and the upper polarizer and overlaps the openings and the substrate bond pads in the openings.

6. The display defined in claim 5 wherein the first substrate layer comprises a thin-film transistor layer.

7. The display defined in claim 6 wherein the second substrate layer comprises a color filter layer.

8. The display defined in claim 7 further comprising opaque masking material on the second surface that overlaps the openings.

9. The display defined in claim 8 wherein the opaque material on the upper polarizer covers the opaque masking material on the second surface.

10. The display defined in claim 9 wherein the opaque masking material on the second surface comprises dots of opaque masking material.

11. The display defined in claim 9 wherein the thin-film transistor layer and color filter layer form an array of pixels in an active area that is bordered by an inactive area without any pixels.

12. The display defined in claim 10 wherein each of the dots overlaps at least one of the substrate contacts.

13. The display defined in claim 11 wherein the opaque masking layer on the first surface has a first portion in the inactive area in which the openings are formed and has a second portion with pixel openings in the active area.

14. The display defined in claim 13 wherein the opaque material on the upper polarizer covers the inactive area.

* * * * *